(12) United States Patent
Hau et al.

(10) Patent No.: US 8,501,302 B2
(45) Date of Patent: Aug. 6, 2013

(54) OFF-SET GEARS AND METHODS OF USING OFF-SET GEARS FOR PRODUCING CUSHIONING MATERIAL

(75) Inventors: Shek-wah Hau, Hong Kong (CN); Chak-sang Simon Chan, Bellevue, WA (US)

(73) Assignee: Nuevopak International Limited, Wanchai (HK)

( * ) Notice: Subject to any disclaimer, the term of this patent is extended or adjusted under 35 U.S.C. 154(b) by 566 days.

(21) Appl. No.: 12/652,036

(22) Filed: Jan. 4, 2010

(65) Prior Publication Data

US 2010/0173130 A1 Jul. 8, 2010

Related U.S. Application Data

(60) Provisional application No. 61/142,327, filed on Jan. 2, 2009.

(51) Int. Cl.
| | |
|---|---|
| *B32B 3/00* | (2006.01) |
| *B32B 3/04* | (2006.01) |
| *D06N 7/04* | (2006.01) |
| *D21H 27/10* | (2006.01) |
| *B65D 81/03* | (2006.01) |
| *B65D 81/09* | (2006.01) |

(52) U.S. Cl.
USPC ........... 428/156; 428/129; 428/154; 428/167; 428/169; 493/967; 229/87.02; 229/87.03; 206/584; 206/814

(58) Field of Classification Search
USPC .................. 428/152–155, 157, 167, 57, 129; 206/584, 814; 493/967; 229/87.02, 87.03
See application file for complete search history.

(56) References Cited

U.S. PATENT DOCUMENTS

| | | | | |
|---|---|---|---|---|
| 4,839,210 A | * | 6/1989 | Komaransky et al. | 428/77 |
| 4,968,291 A | * | 11/1990 | Baldacci et al. | 493/354 |
| 5,340,638 A | * | 8/1994 | Sperner | 428/182 |
| 5,439,730 A | | 8/1995 | Kelly et al. | |
| 5,755,656 A | | 5/1998 | Beierlorzer | |
| 6,037,036 A | * | 3/2000 | Febel | 428/132 |
| 6,436,511 B1 | * | 8/2002 | Ratzel | 428/152 |
| 2002/0137617 A1 | | 9/2002 | Kobben | |

FOREIGN PATENT DOCUMENTS

| | | |
|---|---|---|
| CN | 1189124 A | 7/1998 |
| WO | 9701434 A2 | 1/1997 |

\* cited by examiner

*Primary Examiner* — Donald J Loney
(74) *Attorney, Agent, or Firm* — DWC Law Firm, P.S.; David Chen

(57) ABSTRACT

Some embodiments of the present invention comprise an off-set gear assembly for use in producing cushioning material and methods for using the same. Each gear of the off-set gear assembly has at least two sections. Each section includes a set of gear teeth. The gear teeth of the two sections can be rotationally off-set and this can result in the production of cushioning material with staggered ridges. Some embodiments of the present invention also comprising cushioning material with staggered ridges.

2 Claims, 13 Drawing Sheets

OFF-SET GEARS AND METHODS OF USING OFF-SET GEARS FOR PRODUCING CUSHIONING MATERIAL

CROSS-REFERENCE TO RELATED APPLICATION(S)

This application claims the benefit of U.S. Provisional Patent Application Ser. No. 61/142,327, filed Jan. 2, 2009, which is incorporated herein by reference in its entirety.

BACKGROUND OF THE INVENTION

1. Field of the Invention

The present invention relates to gear assemblies and related methods for using the same in dunnage machines to produce cushioning material.

2. Description of Related Art

The transfer of goods in trade can often present impact hazards for the goods being shipped. Hence, cushioning material or cushioning product (often called "dunnage") is used to pack containers for the goods to provide support and to fill voids in the containers during the transfer process.

Paper-based cushioning material is a popular packing option in comparison with other materials, due to the many advantages that such paper-based materials offer. For example, paper is biodegradable and easily disposed.

In practice, paper-based cushioning material is often generated using a conversion process that involves feeding stock sheet material into a conversion machine. For example, U.S. Pat. No. 4,839,210 to Komaransky, et al., discloses a mechanism and method for producing relatively low density pad-like dunnage from sheet-like stock material. The mechanism takes the sheet-like stock material from a multi-ply (or single-ply) roll and converts it into a pad-like cushioning dunnage product having outer longitudinally extending pillow-like portions connected together along a generally central portion of the dunnage, the central portion extending longitudinally along the length of the dunnage and comprising overlapping edge portions of the stock material which have been folded inward in order to overlap at the central portion. The mechanism includes a converging member which, in conjunction with a forming frame co-acting with the converging member, causes inward rolling of the lateral edge portions of the stock material so that the edge portions of the stock material will overlap one another and the stock material will be formed in an elongated rolled form. The overlapping edge portions of the stock material are then received between a connector (comprised of gears) to connect them together to form the pad-like cushioning product or dunnage. However, it has been observed that the connectors can sometimes be insufficient to cause the overlapping edge portions of the stock material to stay connected after the dunnage is formed, and the overlapping edge portions can split apart during movement of the dunnage. When such splitting occurs, it can reduce the effectiveness of the dunnage because, among other things, the split dunnage provides less cushioning than an intact dunnage.

BRIEF SUMMARY OF THE INVENTION

Various embodiments of gears and methods for using the gears are provided. In some embodiments, a gear assembly is provided for use in producing cushioning material. The gear assembly can have a first rotatable gear and a second rotatable gear. Each rotatable gear can have a first set of gear members and a second set of gear members. Each of the sets of gear members can have a plurality of individual gear members arranged in circumferential fashion about a perimeter of the corresponding rotatable gear with each gear member of the first set of gear members being rotationally off-set from each gear member of the second set of gear members.

In some embodiments, there is a gap between the first set of gear members and the second set of gear members on each rotatable gear.

In further embodiments of the present invention, a cushioning product is provided. The cushioning product can be made of stock material having overlapping edge portions. The overlapping edge portions can be formed, or compressed in a manner, such that the overlapping edge portions have at least a first set of ridges and at least a second set of ridges. Each of the sets of ridges include a plurality of longitudinally spaced apart ridges, with the first set of ridges also being laterally space apart from the second set of ridges. In some embodiments, there is a third set of ridges connected to each of the ridges in the first set of ridges and to each of the ridges in the second set of ridges.

Methods of using the gears having the off-set gear members are also provided herein for some embodiments of the present invention.

DETAILED DESCRIPTION OF PREFERRED EMBODIMENTS OF THE INVENTION

In the following description, certain specific details are set forth in order to provide a thorough understanding of various embodiments of the invention. However, upon reviewing this disclosure one skilled in the art will understand that the invention may be practiced without many of these details. In other instances, well-known or widely available dunnage machine parts have not been described in detail to avoid unnecessarily obscuring the descriptions of the embodiments of the present invention.

Figure 14:
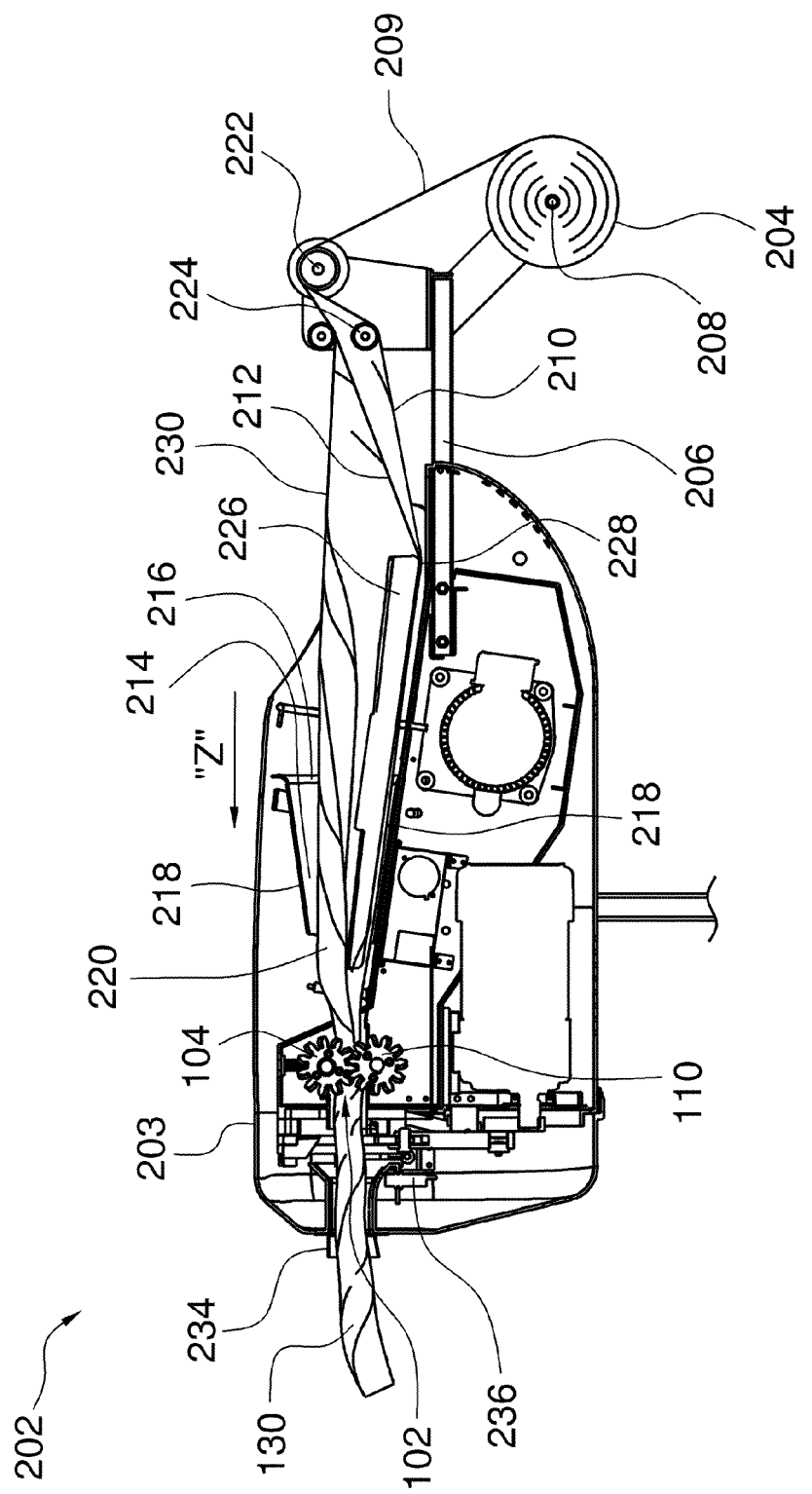
FIG. 14 is a simplified cross sectional view of a dunnage machine which can be used with the prior art gears or the off-set gears of the present invention.

Unless the context expressly indicate otherwise, the term "longitudinal" as used herein can refer to any axis running generally parallel to the line that forms arrow "Z" in FIG. 14, such that the stock paper 209 is fed through the dunnage machine 202 generally along a longitudinal path. Unless the context expressly indicates otherwise, the term "lateral" as used herein can refer to any axis running generally perpendicular to the longitudinal axis, but not vertical with respect to the FIG. 14. Thus in reference to FIG. 14, a lateral axis would extend directly into and outward from the drawing sheet.

Various embodiments of the present invention are described for purposes of illustration, in the context of use with paper-based sheet materials for dunnage formation. However, as those skilled in the art will appreciate upon reviewing this disclosure, other materials may also be suitable for use in producing dunnage.

Referring to FIG. 14, in some prior art systems, a dunnage machine 202 is provided. A stock material, such as paper, in a paper roll 204, can be mounted on a holder 206 in a manner to allow the paper roll to pivot about a central axis 208 of the roll to allow the roll to unwind and dispense paper 209, or sheet material. The paper can be multi-ply paper (or single-ply paper in other cases) having layered separable sheets 210 and 212, as will be understood by those skilled in the art after reviewing this disclosure. The paper 209 can be fed into a funnel-shaped passageway 214 with an entrance opening portion 216 being the widest cross section in the funnel-shaped passageway 214, with the walls 218 of the passageway converging to a more narrow downstream passageway 220.

Paper 209 from the multi-ply stock roll 204 is fed in separate sheets 210, 212 into the funnel-shaped passageway 214, one sheet 210 passing over roller 222 and beneath roller 224, and another sheet 212 passing over roller 224. A laterally centered portion 228 of the sheets 210, 212 is positioned beneath a feed member 226, with the lateral edge portions 230 of the sheets 210, 212 being folded upward around the feed member 226 and inwardly, to roll or fold the edges portions of the paper 209 inwardly as it is fed downward through the passageway 214 in the longitudinal direction of arrow "Z." The paper 209 is pulled through the passageway in the direction of arrow "Z" by a prior art gear assembly (such as the gear assembly 102 shown in FIG. 3), comprised of a driving gear 104 and a lower, driven gear 110 the gears being illustrated in FIG. 14 in the dunnage machine 202, and in FIG. 3 in isolation. The driving gear 104 can be directly connected to a motor shaft (not illustrated) to actuate the driving gear 104, while the driven gear 110 is driven by the driving gear 104 as the teeth of the driven gear 110 interlock with the teeth of the driving gear 104.

Figure 7:
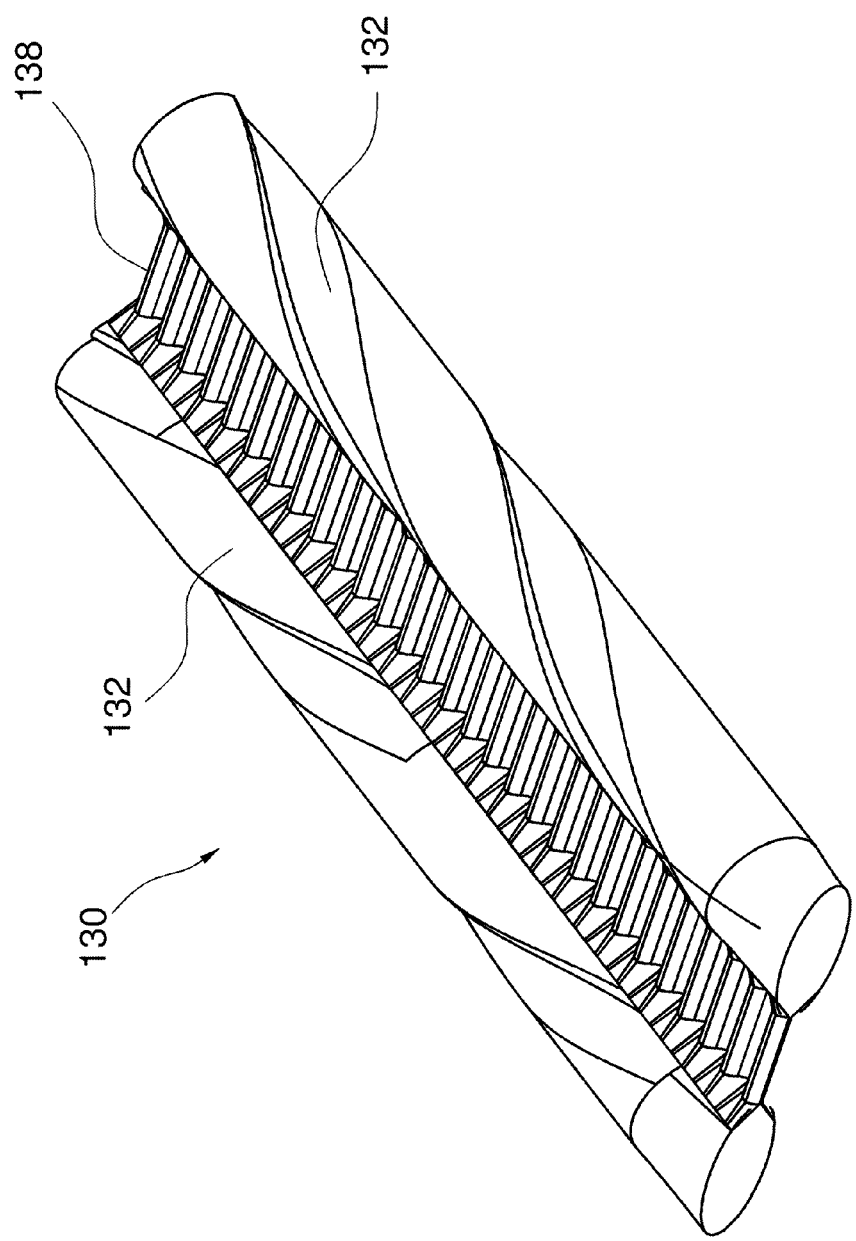
FIG. 7 is a perspective view of a prior art dunnage section formed in a dunnage machine using the prior art gear assembly of FIG. 3.
Figure 8:
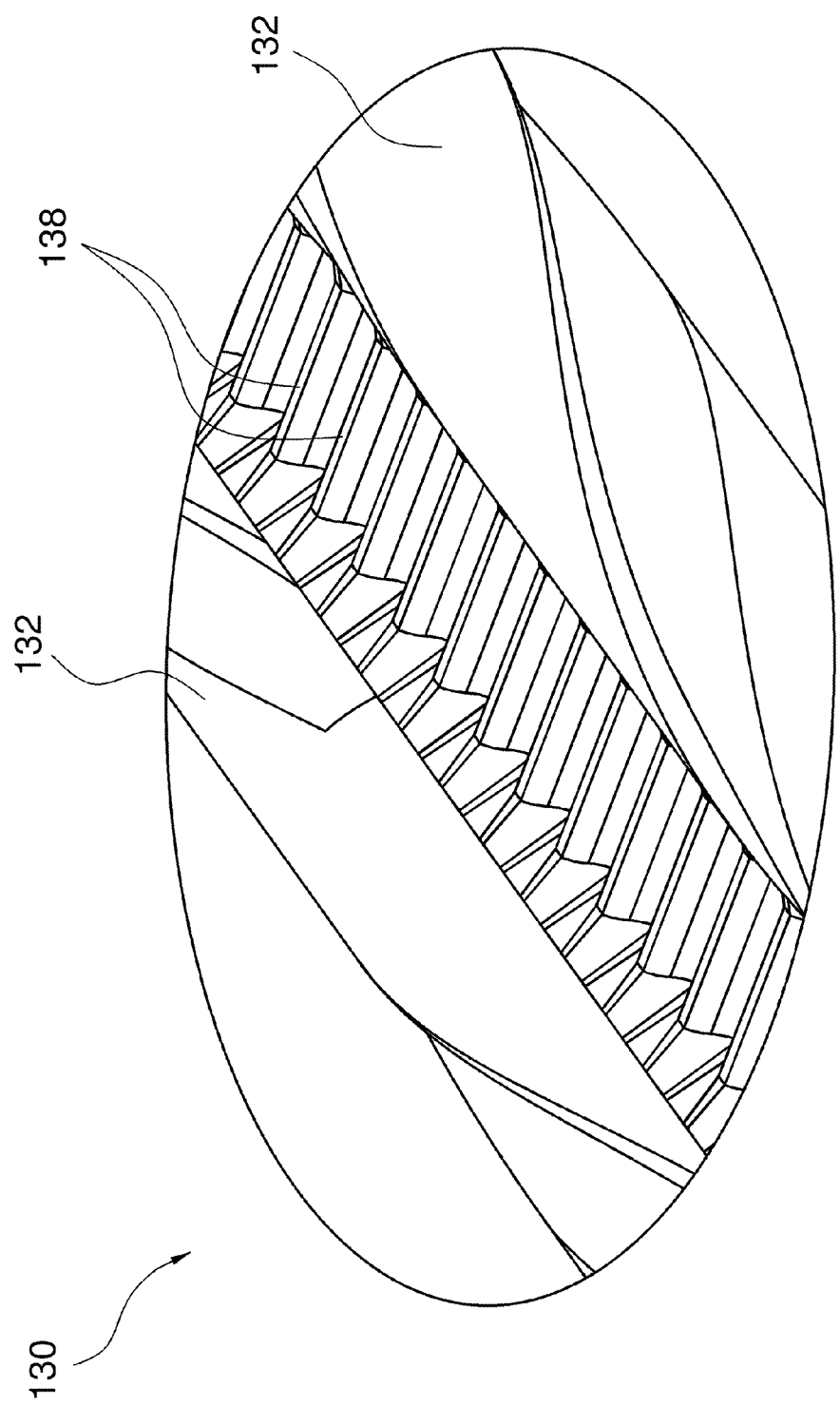
FIG. 8 is an enlarged perspective view of a portion of the dunnage section shown in FIG. 7.

The gears 104 and 110 are positioned near a laterally central portion of the paper 209. The laterally central position of gears 104 and 110 allows the gears to compress overlapping edge portions of the paper 209 which are folded over one another at a laterally central portion of the paper 209, to generate the compressed or formed portion 138 of the prior art dunnage 130 shown in FIGS. 7 & 8. The uncompressed portions 132, or pillow-like portions, of the prior art dunnage product are also illustrated in FIGS. 7 & 8. As will be appreciated by those skilled in the art after reviewing this disclosure, when the lateral edge portions of the paper 209 are folded over one another to overlap, the overlapping edge portions overlap at a laterally central portion of the folded paper. That laterally central portion of the paper 209 comes into contact with the gears 104 & 110, illustrated in FIG. 3, to be compressed between the gears to create the formed portion 138, while the outer portions 132 of the folded paper 209 pass by the gear without being compressed so as to form into pillow-like portions 132.

Referring back to FIG. 14, the dunnage 130 exits the dunnage machine 202 through exit chute 234. Also, an automated cutter 236 can be provided having a blade. The cutter can be of a type similar to that disclosed in U.S. Pat. No. 4,026,198, which is incorporated herein by reference in its entirety, including, without limitation, the description related to the cutter starting in column 6, line 41 and continuing through column 7, line 6, and all figures referenced therein. The automated cutter 236 can be used to automatically cut sections of dunnage 130 as the dunnage passes through the exit chute 234, by periodically cutting the dunnage strips as they are produced in the dunnage machine 202, as will be appreciated by those skilled in the art. The cut dunnage sections are then ready to use for filling voids, or to provide cushioning in packaging or containers for transporting goods.

For purposes of illustration, it is noted that an additional description of a prior art dunnage machine is provided in U.S. Pat. No. 4,839,210 (mentioned above in the BACKGROUND), which is incorporated herein by reference in its entirety, including, without limitation, the description thereof starting from column 4, line 49 and continuing through column 10, line 62, and all figures referenced in that portion of the description, describing the operation and structure of the converter mechanism or dunnage machine.

Figure 9:
FIG. 9 is a photograph showing two dunnage sections formed using a dunnage machine that employs a prior art gear assembly similar to that shown in FIG. 3, the photograph illustrating some split dunnage sections yielded by the prior art gear assembly.
Figures 10, 11:
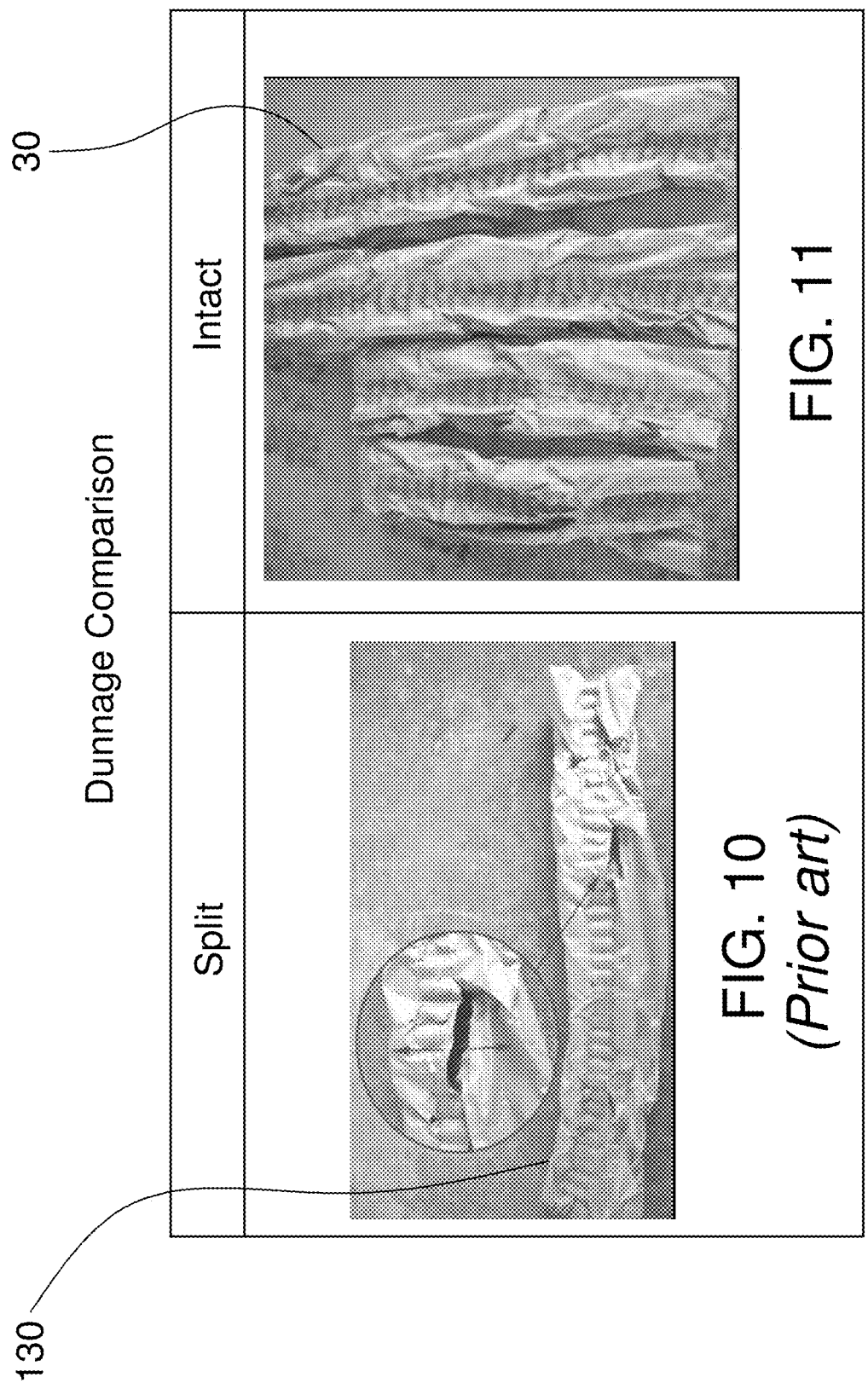
FIGS. 10-13 are photographs illustrating some dunnage sections formed using the prior art gear assembly and some dunnage sections formed using the gear assembly of the present invention.

The inventors hereof have observed that the prior art dunnage sections 130 can have a tendency to "split," by coming apart during movement or jarring of the dunnage sections 130, or otherwise during the generation of the dunnage, at their overlapping edge portions or formed portions 138. Although not all the prior art dunnage will split, at times, a high enough percentage of the prior art dunnage 130 generated can split such at performance of the dunnage can be impacted. For example, as shown in FIG. 9, the heads of arrows "E" and "F" point to formerly overlapping lateral edge portions of the sheet or stock material that have come apart, or "split," in the prior art dunnage sections 130 such that the dunnage sections 130 become open. It is desirable to maintain the dunnage sections closed, without any "splitting," because when the dunnage sections open, with the lateral edge portions coming apart, the volume occupied by the dunnage section is reduced, thereby reducing the ability of the dunnage section to provide cushioning or shock absorption as a packaging material. Furthermore, as shown in FIG. 10, the "split" can also occur away from the ends of a dunnage section 130, and near a middle portion of the dunnage section 130, which can also lead to further splitting until the entire dunnage section 130 becomes open. The arrows drawn in the enlarged view section bordered by a circle in FIG. 10, illustrate the general direction of splitting when it occurs in a middle portion of dunnage section 130.

Figure 1:
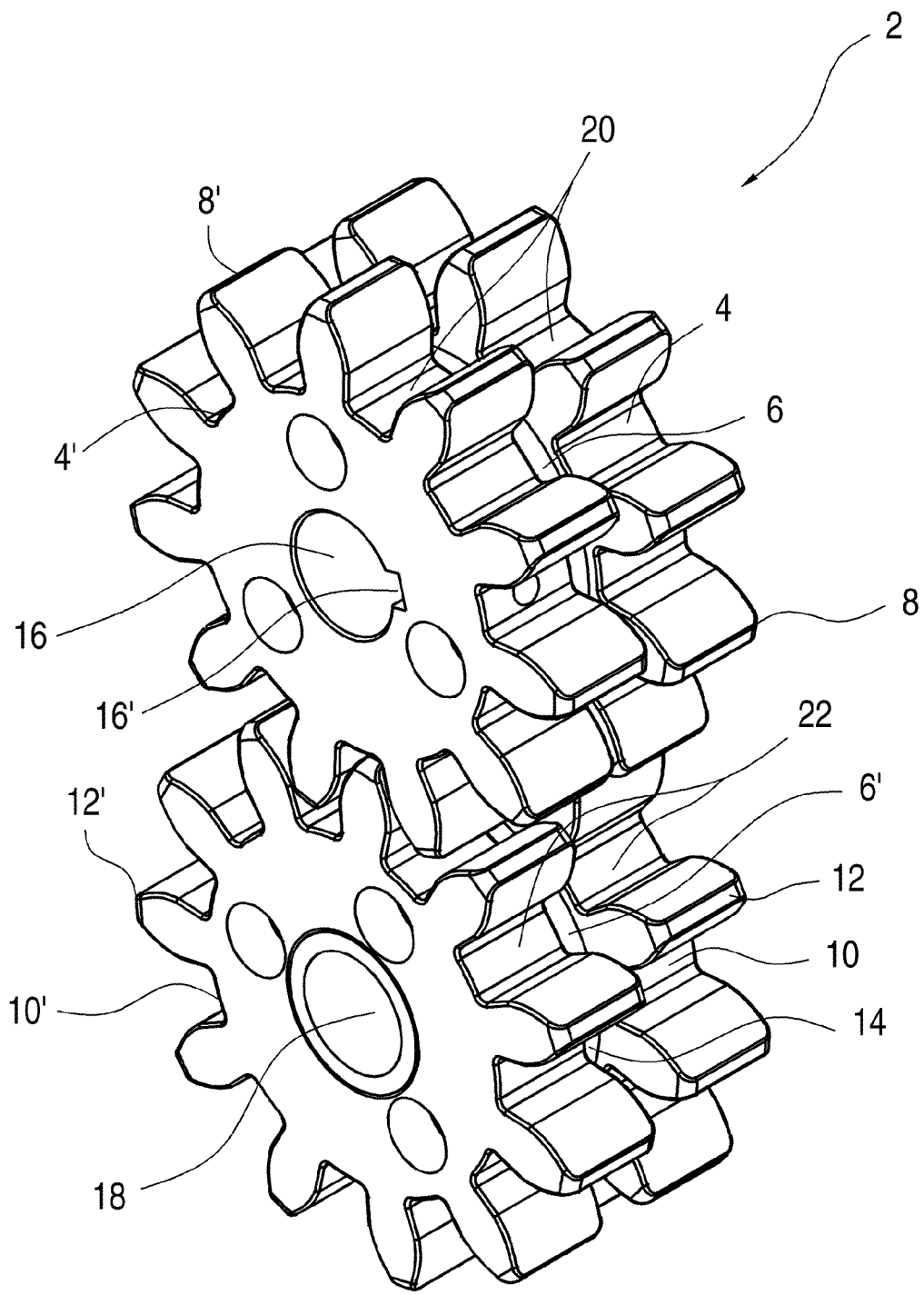
FIG. 1 is a perspective view of an embodiment of a gear assembly of the present invention, for use in a dunnage machine.
Figure 2:
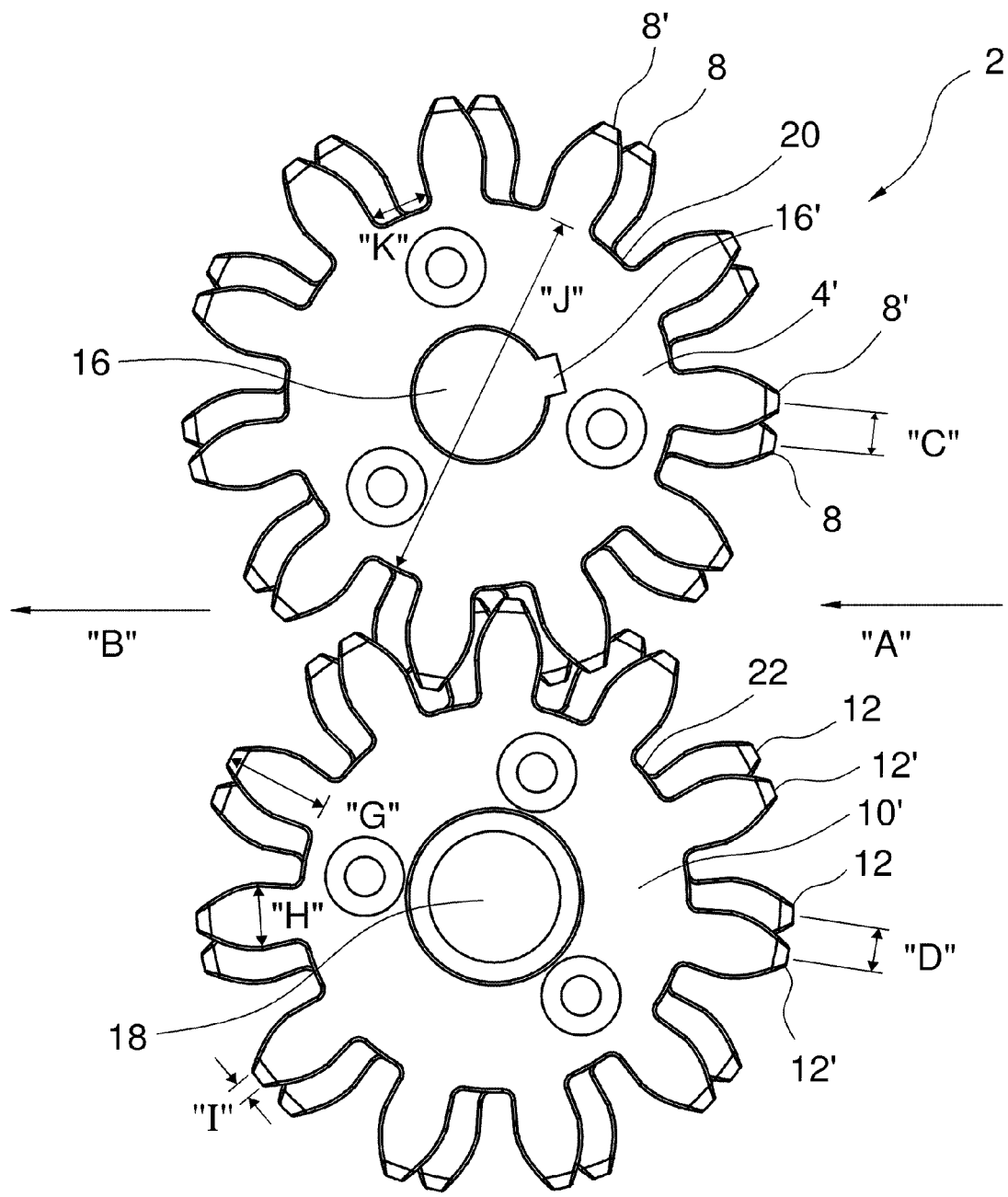
FIG. 2 is a side elevation view of the gear assembly of FIG. 1.
Figure 3:
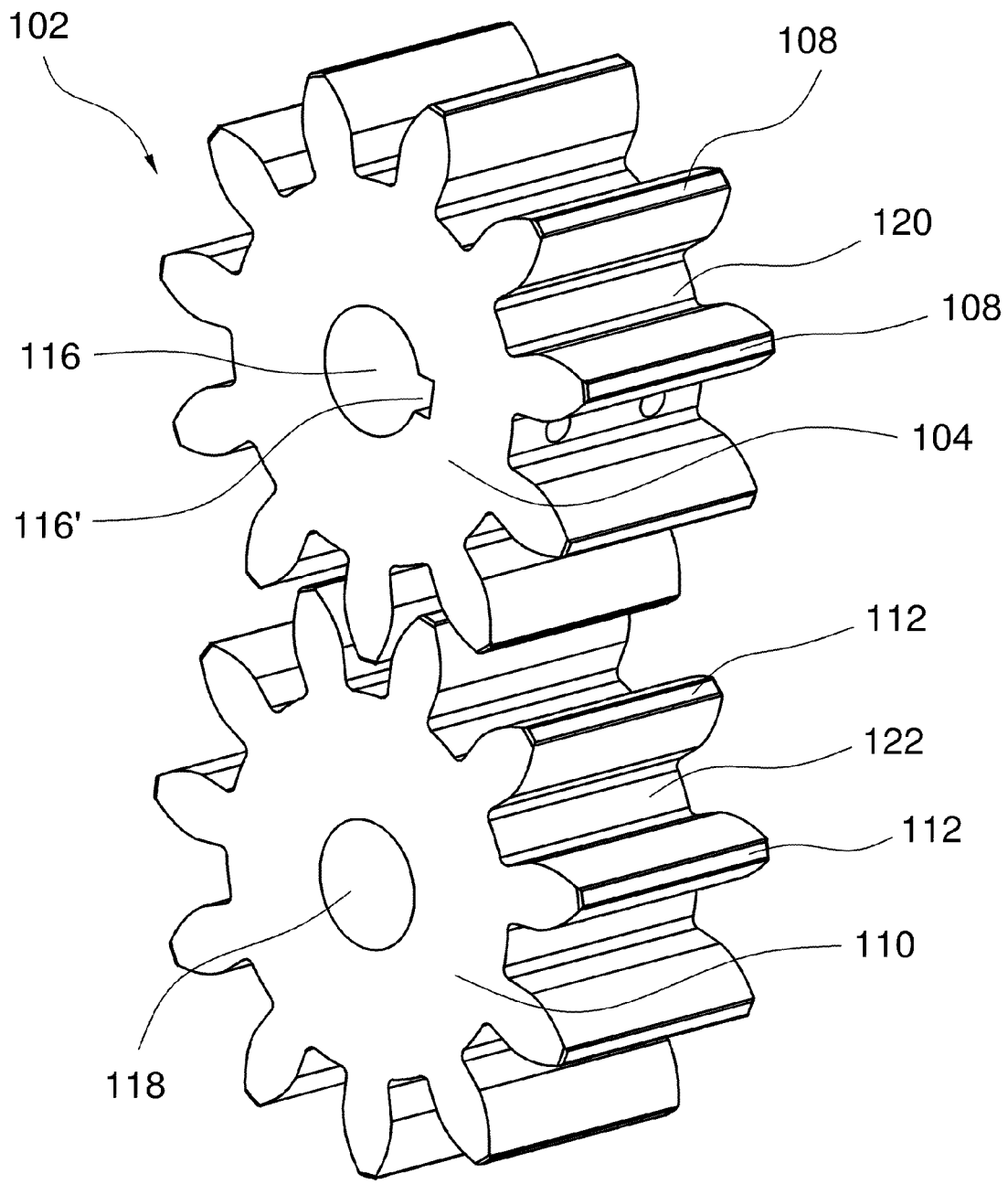
FIG. 3 is a perspective view of a prior art gear assembly for use in a dunnage machine.

In some embodiments of the present invention, an off-set gear assembly 2, such as that shown in FIGS. 1 & 2 is provided as a substitute for the prior art gear assembly 102 shown in FIGS. 3 and 14. In the off-set gear assembly 2, the driving gear 4, 4' and driven gear 10, 10' of the off-set gear assembly can each be comprised of two circular gear sections, which are coupled together. For example, driving gear 4, 4' can have a first circular section 4 and a second circular section 4', and can have a circumferential gap 6 that extends about a surface of the gear 4, 4' between the two circular sections 4 and 4', the circular sections 4, 4' being aligned to share a common axis about which the circular sections 4, 4' can rotate.

A driving shaft can be coupled through the driving gear 4, 4' through central connecting aperture 16 in order to drive the driving gear. The aperture 16 can include a notch 16' formed on an interior wall of the aperture 16, to allow a protrusion of the shaft (not illustrated) to interlock within the notch 16' to prevent slipping of the shaft within the aperture 16. The circular sections 4, 4' of the driving gear can be coupled together by attachment or can be formed together in connected form as will be appreciated by those skilled in the art after reviewing this disclosure.

Each circular section 4, 4' has a set of gear members or teeth comprised of individual gear members 8, 8', with gaps 20 between the gear members. The gear members 8, 8' can each extend generally radially outward away from a central axis of the driving gear 4, 4'. The shape of the gear members 8, 8' can include a base portion that is wider than a top portion.

In some embodiments of the present invention, the gear members 8 of circular section 4 can be rotationally off-set from the gear members 8' of circular section 4', as can be seen in FIGS. 1 & 2. For example, as shown in FIG. 2, a mid-point of the top surfaces or tips of the teeth or gear members 8' on gear section 4', are rotationally off-set from a mid-point of the tips of the teeth or gear member 8 on gear section 4, as shown by arrow "C." In some embodiments, the length of the off-set shown by arrow "C," is less than a maximum width of the gear members 8, 8', as viewed from a side of the gears as shown in FIG. 2.

Referring back to FIG. 1, the driven gear 10, 10' can have structure similar to the driving gear. The driven gear 10, 10' can be comprised of a first circular section 10 and second circular section 10', the two of which are attached or formed together. Each circular section 10, 10' can have an associated set of gear members (or gear teeth) comprised of individual gear members 12 or 12', with the gear members of the first circular section 10 being rotationally off-set from the gear members of the second circular section 10', as shown by arrow "D" in FIG. 2. Also, circumferential gap 6' can be provided between the sets of gear members of the two circular sections 10, 10'.

Referring to FIG. 2, in the illustrated embodiments of the present invention, the each gear member 8, 8', 12, 12' can have height "G" of approximately ⅝ inch, a maximum width "H" of approximately ⅜ inch and a minimum width "I" of approximately 3/16 inch. The length of the off-set "C" can be approximately 3/16 inch. In some embodiments, if "C" is taken to represent a rotational off-set in degrees, with an entire turn of the gear 4, 4' being 360 degrees, the rotational offset is approximately 4-6 degrees. In other embodiments, the rotational off-set is approximately 6-12 degrees. A diameter "J" of each gear section, excluding the height of the gear members 8, 8', 12, 12' can be approximately 2¼ inches. A width "K" of the gaps 20 between the gear members at their base can be approximately 5/16 inch.

Figure 15:
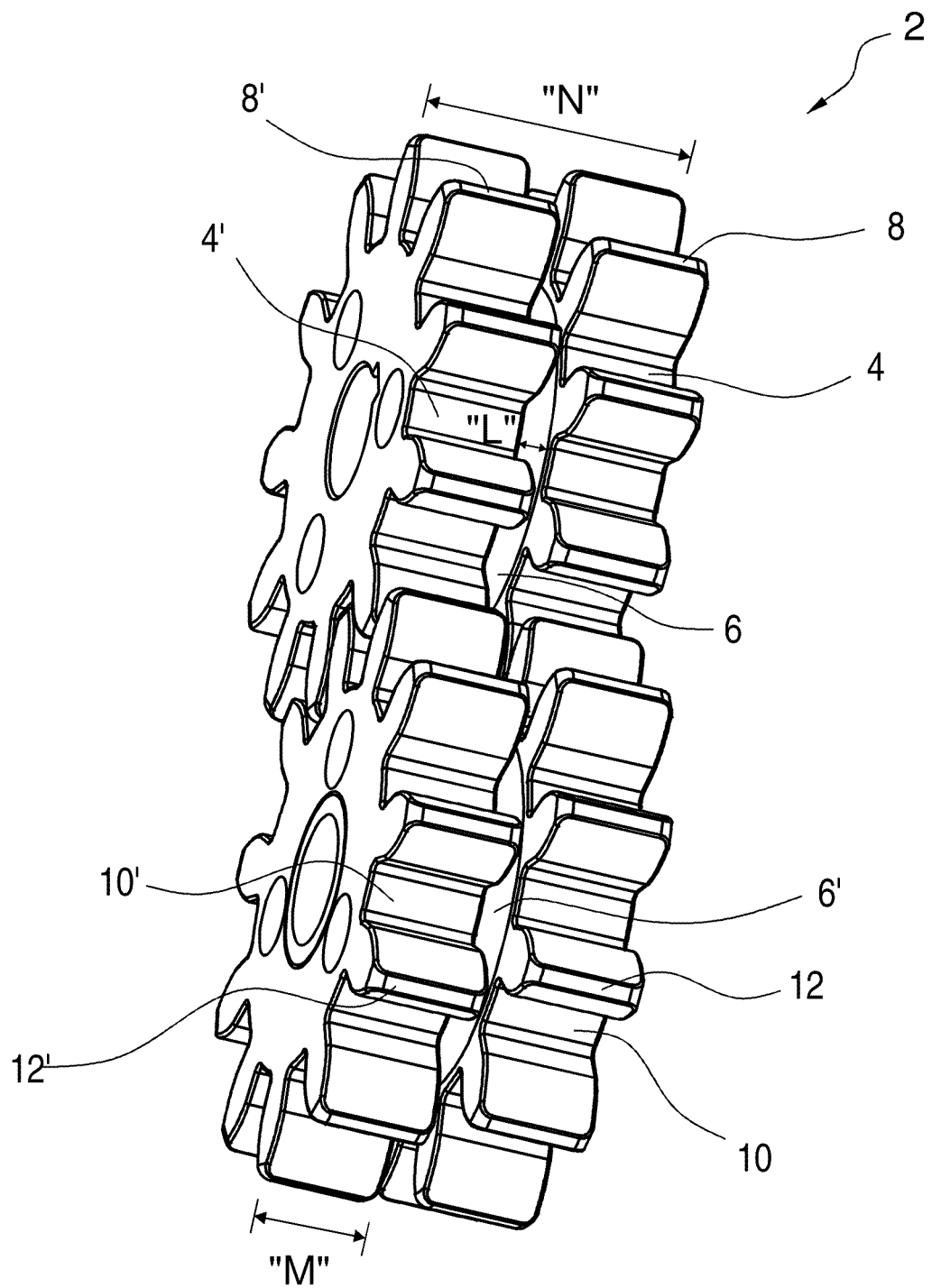
FIG. 15 is a perspective view of an embodiment of the gear assembly of FIG. 1, comprising the driving gear and the driven gear, and further showing a circumferential gap between each of the circular gear sections.

Referring now to FIG. 15, a lateral width "L" of the circumferential gaps 6, 6' can be approximately ¼ inch (or between ¼ to ½ inch). A lateral width "M" of each gear member 8, 8', 12, 12' can be approximately 11/16 inch (or between 11/16 to 1 inch). A ratio of "L" to "M" can be about 0.36 (or can be between about 0.30 to about 0.50). A lateral width "N" of the driving gear and driven gear can be approximately 1 and 10/16 inches. The dimensions disclosed above list example dimensions used in an embodiment of the present invention; however, it is contemplated by the inventor(s) hereof that various embodiments of the off-set gear assembly of the present invention may incorporate different dimensions or ranges of dimensions which are greater than or less than that described above. Also, in some embodiments, the dimensions are not uniform such as, for example, the gear teeth may have different dimensions within the off-set gear assembly 2.

In some embodiments of the present invention, the off-set gear assembly 2, can be utilized in the dunnage machine 202, or other dunnage machines, as a substitute for the prior art straight gear assemblies (such as prior art gear assembly 102). The overlapping edge portions of the paper 209 can pass through the laterally centrally positioned off-set gear assembly 2, in the direction of arrows "A" and "B" as shown in FIG. 2. As the overlapping edge portions of the paper 209 pass between the driving gear 4, 4' and driven gear 10, 10', the interlocking gear members 8, 8', 12, 12' compress or form the overlapping edge portions; however, there remains an uncompressed portion due the circumferential gap 6, 6' that is present between the two sets of gear members on each gear. That gap results in an additional ridge on the formed portions of dunnage sections 30 produced by the off-set gear assembly 2 as described further below as a "generally diagonal ridge."

Figure 4:
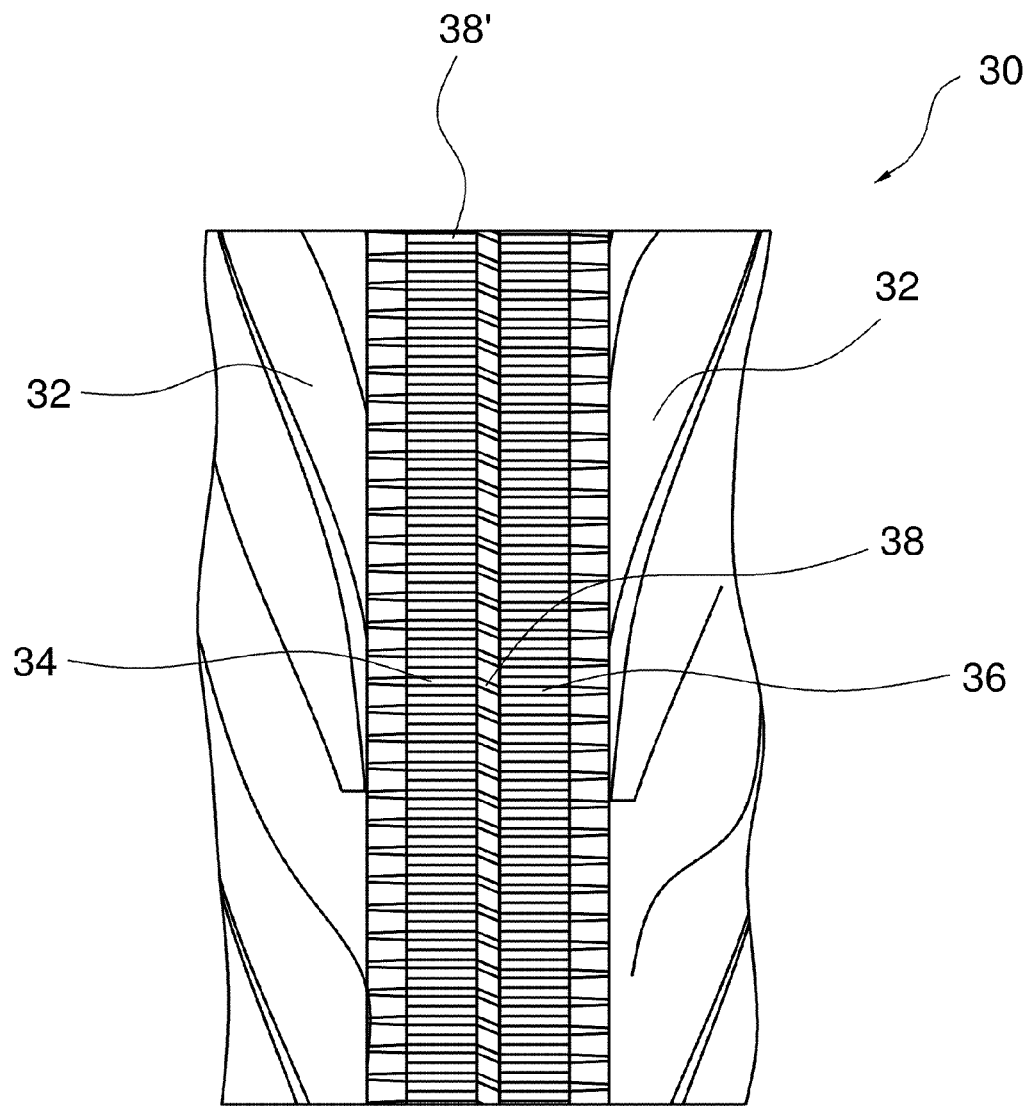
FIG. 4 is an overhead plan view of a dunnage section formed in a dunnage machine by using the gear assembly of FIG. 1.
Figure 5:
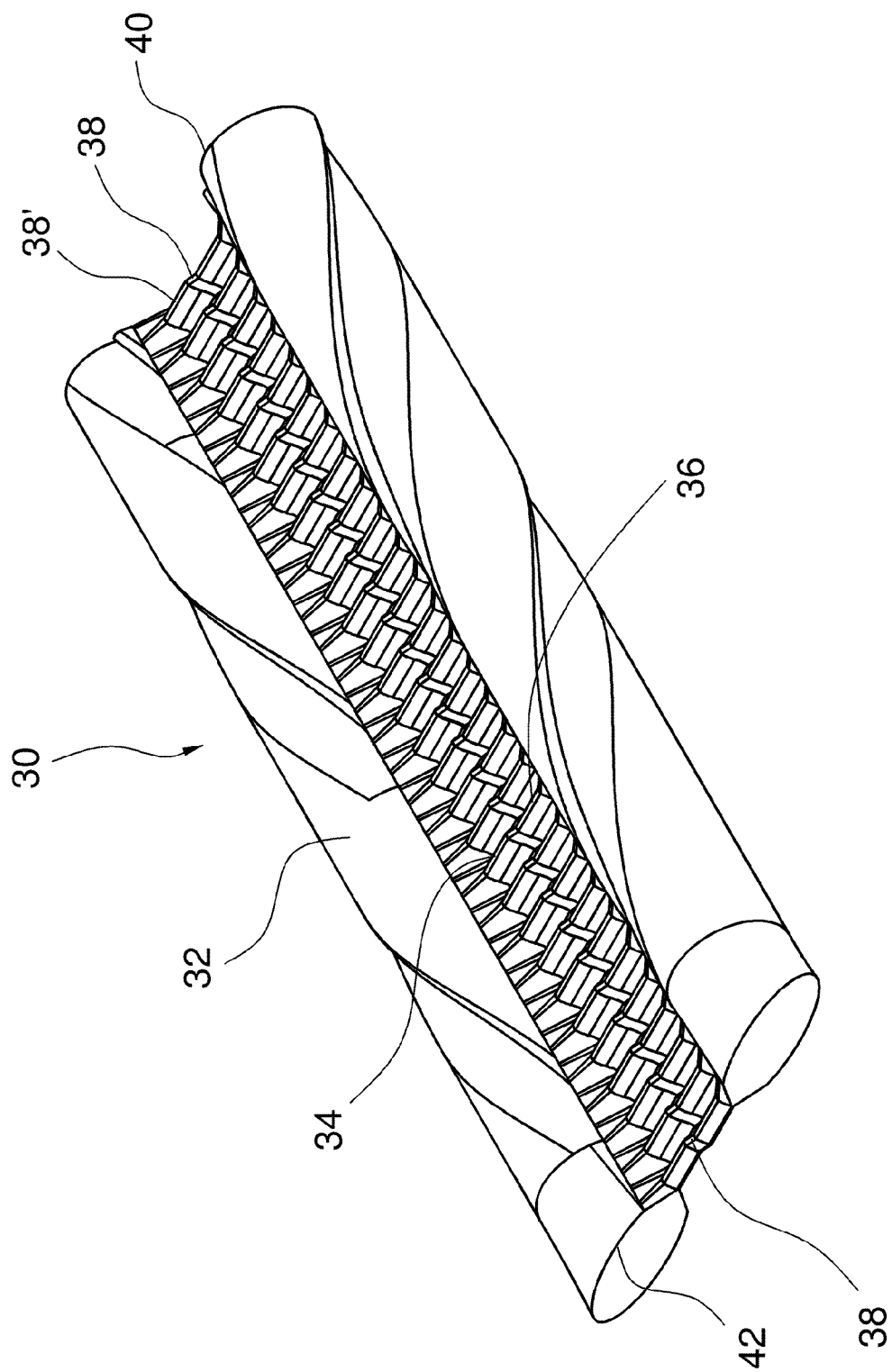
FIG. 5 is a perspective view of the dunnage section shown in FIG. 4.
Figure 6:
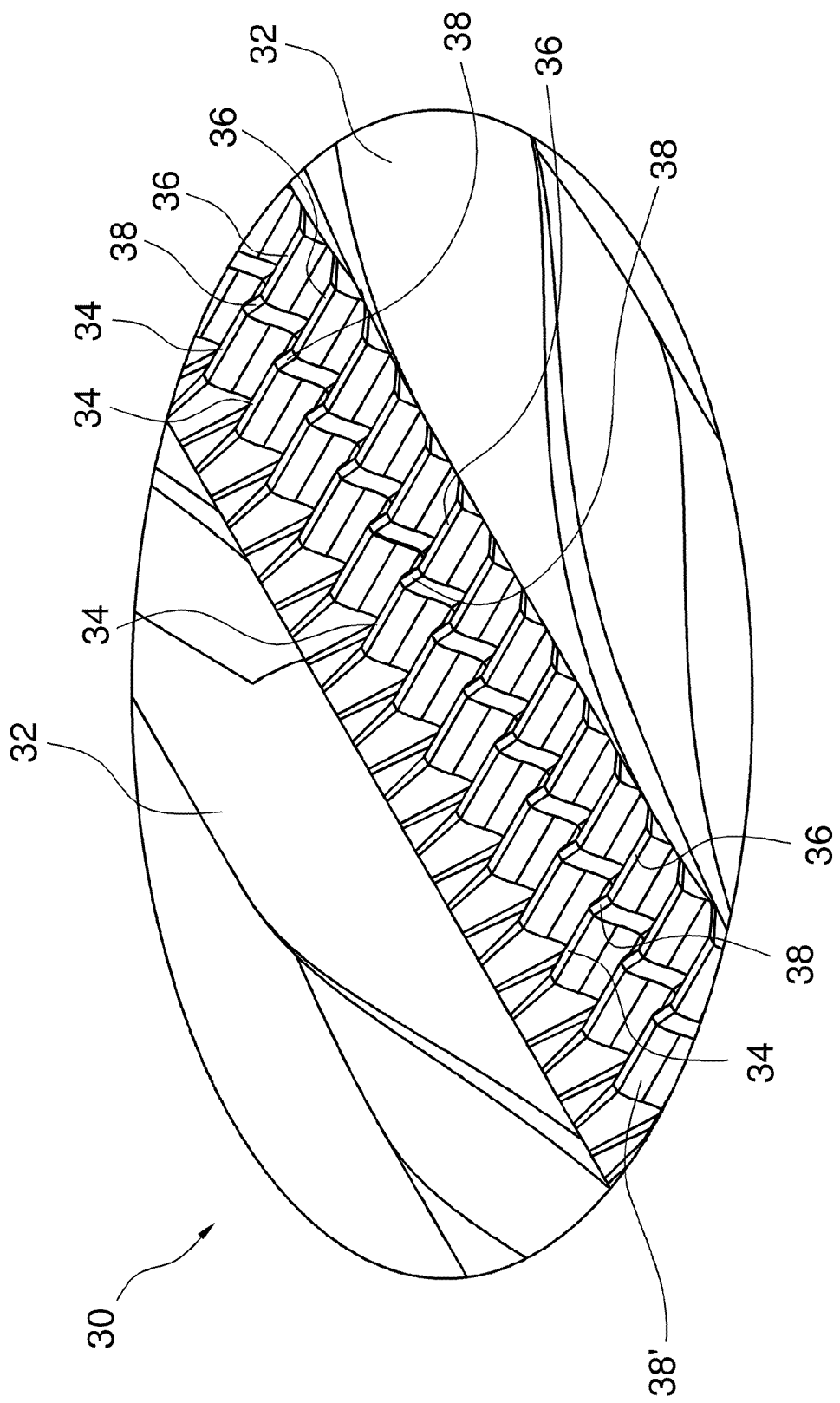
FIG. 6 is an enlarged perspective view of a portion of the dunnage section shown in FIG. 5.

Simplified diagrams of the dunnage sections 30 produced using the off-set gear assembly 2 of the present invention are illustrated in FIGS. 4-6. The overlapping edge portions, or formed portions 38', of dunnage sections 30, formed by the off-set gear assembly 2, include staggered ridges 34, 36 separated by a generally diagonal ridges 38. Ridges 36 can be produced by the left-side gear teeth, such as gear members 8' & 12' on corresponding gear sections 4' and 10'. Ridges 34 can be produced by the right side gear teeth 8 & 12 on corresponding gear sections 4 & 10. Since the ridges 34, 36 of the dunnage sections 30 are formed in a staggered fashion, due to the rotationally offset positions of the gear members 8, 8', 12 and 12', generally diagonal ridges 38 are also formed, which bridge corresponding staggered ridges 34, 36, as best seen in FIG. 6. In some embodiments, the diagonal ridges 38 are formed within in a gap area, such as, for example, gaps 6, 6', between the different sets of gear members on each gear section. The gaps 6, 6' can be best seen in FIG. 15. The dunnage sections 30 formed using the off-set gear assembly 2 differ from the prior art dunnage sections 130 formed by the prior art straight gear assembly 102. As best seen in FIGS. 7 & 8, the prior art dunnage sections 130 have only one ridge 138 in the compressed portion of the dunnage sections.

The structure for some embodiments of dunnage sections 30 of the present invention that include staggered ridges 34, 36 and diagonal ridges 38 helps sustain the relative positions of the overlapping edge portions 38' of the stock material to avoid "splitting" of the dunnage sections 30.

Figures 12, 13:
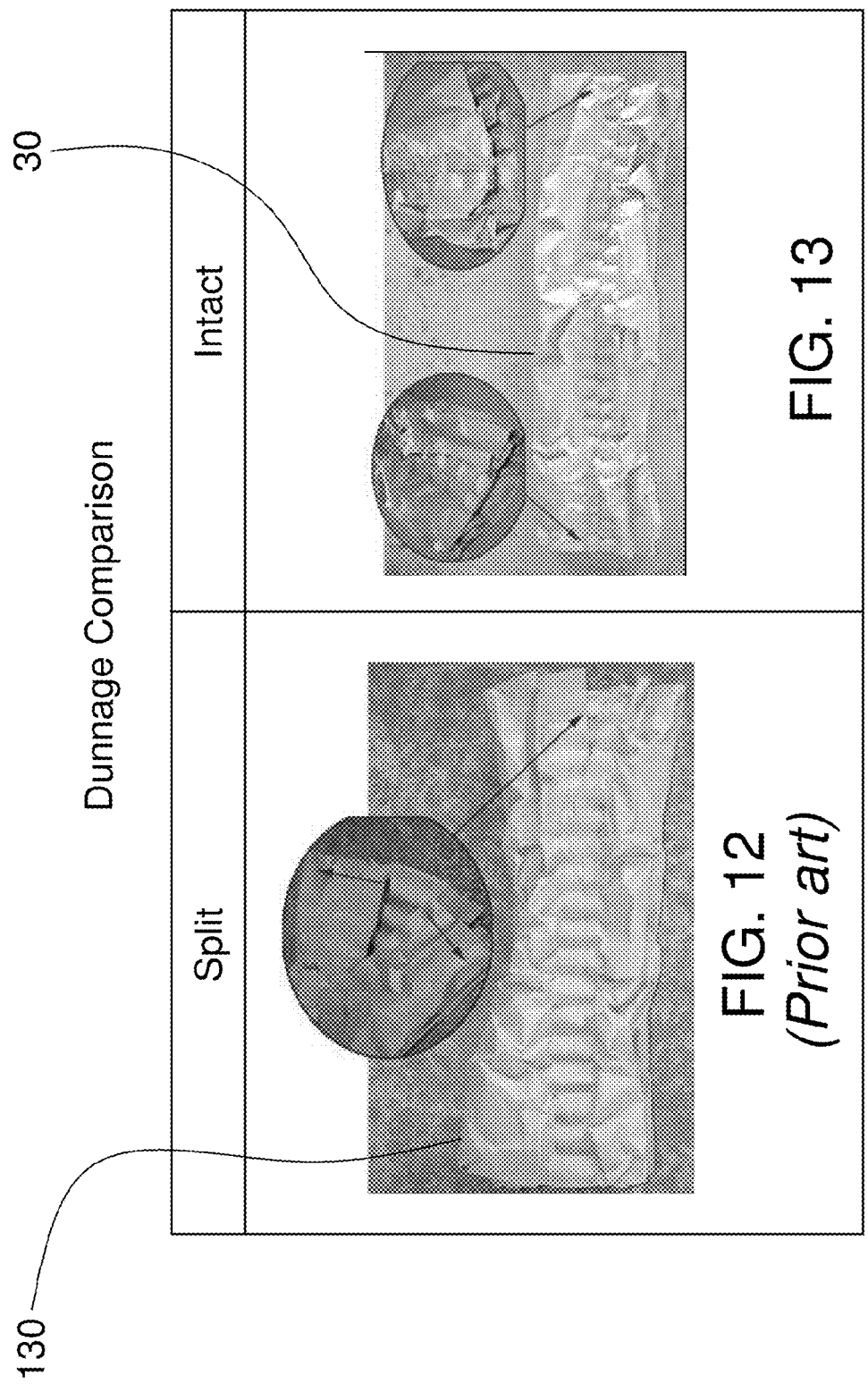

The tendency of the dunnage sections 30 to resist splitting has been empirically observed in the form of generally higher yield of "intact" or non-split dunnage produced using an off-set gear assembly 2 of the present invention when compared to dunnage 130 produced using a prior art gear assembly similar to that shown in FIG. 3 (with "yield" being defined herein as a percentage or portion of the total number dunnage sections produced which are observed to exhibit no splitting). FIGS. 11 & 13 show some example pictures of dunnage sections 30 formed by the off-set gear assembly 2, which tend to resist splitting after being subject to certain forces. FIGS. 10 & 12 show pictures of some dunnage sections 130 formed by a prior art gear assembly 104, 110 that exhibit splitting. It is not intended to imply that FIGS. 10 &12 represent all dunnage produced by prior art gears or that FIGS. 11 & 13 represent all dunnage produced by the off-set gears of the present invention. Instead, those photographs are examples to illustrate the occurrence of "split" versus "intact" dunnage.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices, systems and methods can omit some elements or acts, can add other elements or acts, or can combine the elements or execute the acts in a different manner or order than that illustrated, to achieve various advantages of the invention. These and other changes can be made to the invention in light of the above detailed description. Accordingly, the invention is not limited except as by the appended claims and the equivalents thereof.

What is claimed is:

1. A cushioning product comprising:
   a stock material having overlapping edge portions, the overlapping edge portions having at least a first set of ridges and at least a second set of ridges, each of the sets of ridges including a plurality of longitudinally spaced apart ridges, with the at least first set of ridges also being laterally spaced apart from the at least second set of ridges;
   pillow-like portions positioned laterally outward of the overlapping edge portions, the pillow-like portions extending longitudinally along a length of the cushioning product; and
   at least a third set of ridges that are diagonally configured in relation to the first and second set of ridges, the third set of ridges dispose between the pillow-like portions.

2. The cushioning product of claim 1 wherein at least one ridge of the third set of ridges is connected to at least one of the ridges in the first set of ridges and to at least one of the ridges in the second set of ridges.

* * * * *